F. S. ROSE, DEC'D.

CORONA TYPEWRITER COMPANY, INC., ASSIGNEE.

TYPE WRITING MACHINE.

APPLICATION FILED MAY 22, 1915.

Reissued June 22, 1915.

13,934

3 SHEETS—SHEET 1.

WITNESSES:

J. Wright Smith

C. Bartels

Frank S. Rose, Deceased
INVENTOR

Corona Typewriter Company Inc. Assignee
BY

Criswell & Criswell
ATTORNEYS

F. S. ROSE, DEC'D.

CORONA TYPEWRITER COMPANY, INC., ASSIGNEE.

TYPE WRITING MACHINE.

APPLICATION FILED MAY 22, 1915.

Reissued June 22, 1915.

13,934.

3 SHEETS—SHEET 2.

WITNESSES:

INVENTOR

Frank S. Rose, Deceased

Corona Typewriter Company Inc. Assignee

BY

ATTORNEYS

F. S. ROSE, DEC'D.

CORONA TYPEWRITER COMPANY, INC., ASSIGNEE.

TYPE WRITING MACHINE.

APPLICATION FILED MAY 22, 1915.

Reissued June 22, 1915.

13,934.

3 SHEETS—SHEET 3.

WITNESSES

INVENTOR

Frank S. Rose, Deceased

Corona Typewriter Company Inc. Assignee

By Criswell & Crisswell

ATTORNEYS

UNITED STATES PATENT OFFICE.

FRANK S. ROSE, DECEASED, LATE OF NEWARK, NEW JERSEY, BY CORONA TYPEWRITER COMPANY, INC., OF GROTON, NEW YORK, ASSIGNEE BY MESNE ASSIGNMENTS.

TYPE-WRITING MACHINE.

13,934. Specification of Reissued Letters Patent. Reissued June 22, 1915.

Original No. 754,242, dated March 8, 1904, Serial No. 142,828. Application for reissue filed May 22, 1915. Serial No. 29,761.

*To all whom it may concern:*

Be it known that the CORONA TYPEWRITER COMPANY, INC., a corporation organized and existing under the laws of the State of New York, United States of America, assignee, by mesne assignments, of FRANK S. ROSE, deceased, late a citizen of the United States and a resident of Newark, in the county of Essex and State of New Jersey, makes application for certain new and useful Improvements in Type-Writing Machines, invented by the said FRANK S. ROSE, of which the following is a full, clear, and exact description.

This invention relates to improvements in typewriters, in which it is sought to produce a new construction of the support or carriage for the type-platen or cylindrical roller which enables the same to be folded into compact relation to the keyboard, thus making provision for ready and convenient transportation of the instrument.

Another object is to provide improved means for shifting the platen relatively to the point of impact of the type-faces on the type-levers.

Further objects and advantages of the invention will appear in the course of the subjoined description, and the novelty will be defined by the annexed claims.

Reference is to be had to the accompanying drawings, forming a part of this specification, in which similar characters of reference indicate corresponding parts in all the figures.

Figure 1:
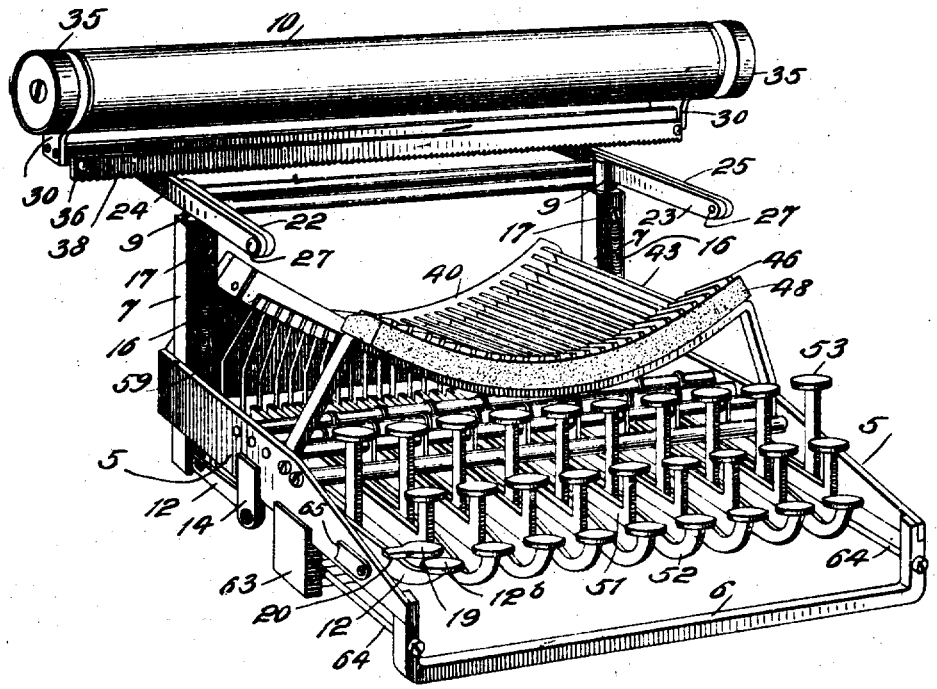
Figure 2:
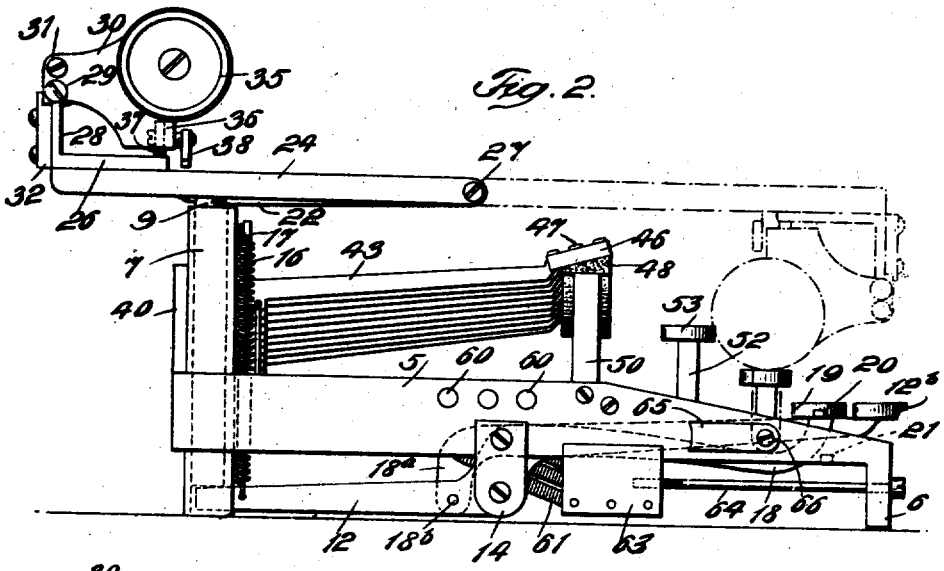
Figure 3:
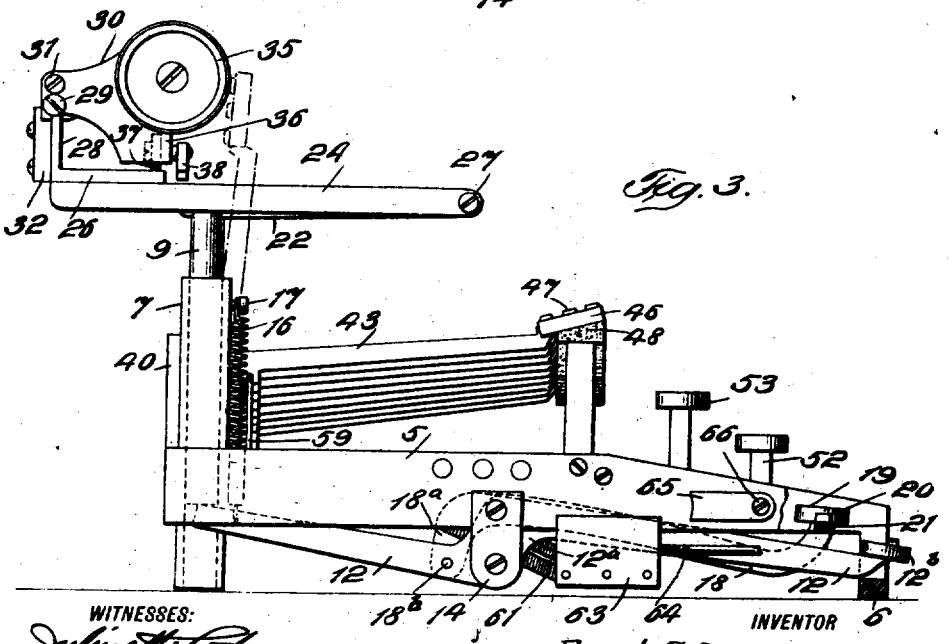
Figure 4:
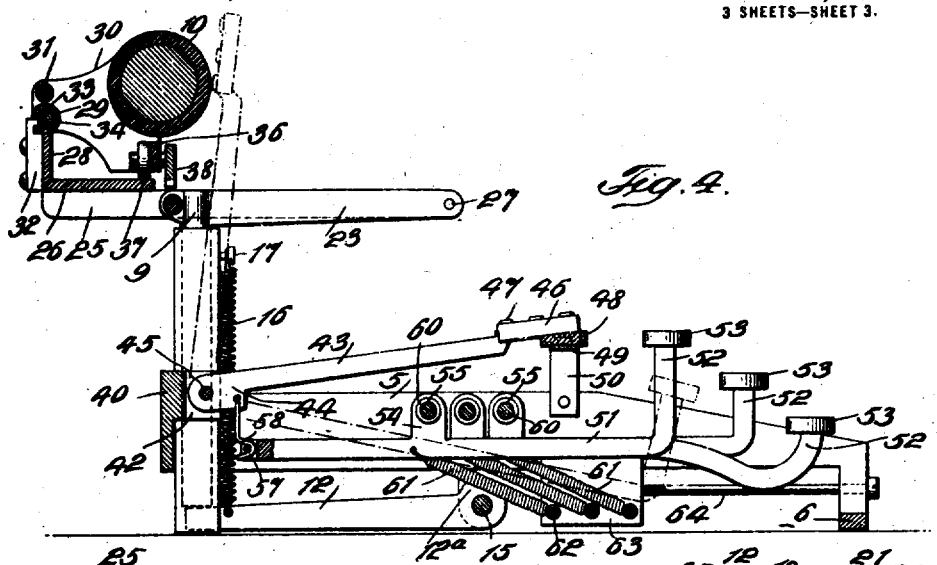
Figure 5:
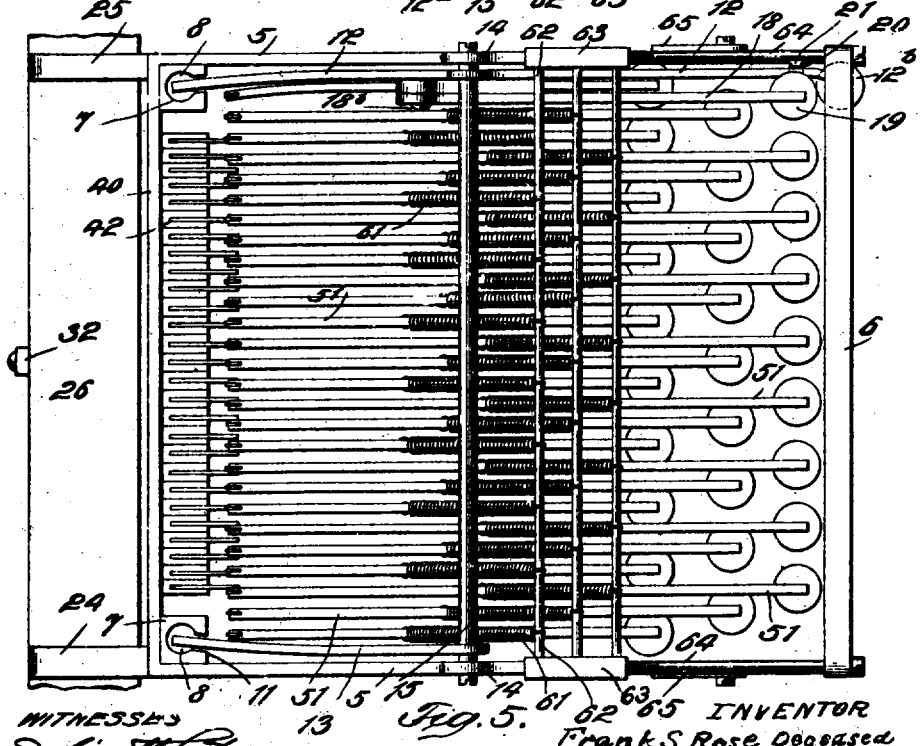

Figure 1 is a perspective view of a typewriting machine constructed in accordance with the invention, omitting certain parts, such as the inking mechanism and the escapement. Figs. 2 and 3 are views in side elevation, showing the different adjustments of the carriage and platen devices, said carriage and the platen being represented in their folded positions by dotted lines in said Fig. 2. Fig. 4 is a vertical transverse section through the machine, the dotted lines illustrating a depressed position of one key-lever and a raised position of the corresponding type-lever. Fig. 5 is an inverted or under plan view of the typewriting machine.

The several working parts of the improved machine are mounted on a suitable frame, which may be of any desired construction; but in the drawings this frame consists of the side bars 5, a yoke-shaped front bar 6, and the posts 7, said parts being united in any preferred way and presenting a substantial construction for the working elements. It will be understood, however, that the style of the frame is not material and that it may be modified as desired by a skilled constructor. The posts are parallel and located at the rear corners of the frame, said posts being hollow to form the vertical channels or guideways 8, adapted to receive the slidable stems 9, which support the frame for the carriage, in which is mounted a platen 10. The posts 7 are provided in their front sides and at their lower ends with slots 11, which accommodate the rear end of the lever 12 and an arm 13. Said lever is disposed on one side of the machine, as shown by Fig. 5, while the arm 13 is on the opposite side of the machine. The frame is provided with depending bearings 14, in which is journaled a horizontal rock-shaft 15, the same being disposed below the banks of key-levers to be presently described. The arm 13 is secured rigidly at its front end to the rock-shaft 15, while the lever 12 is bent or offset at a point intermediate of its length, as at $12^a$, said offset portion of the lever being secured rigidly to the rock-shaft 15 near the other end from the arm 13. It will be understood that the arm 13 and the rear end of the lever 12 fit loosely in the slots 11 and the channels 8 of the posts 7, and said lever and the arm are disposed below and in engagement with the lower ends of the slidable stems 9.

Lifting springs 16 are operatively connected with the lever 12 and the arm 13, said springs being shown by the drawings in the form of coiled springs disposed in vertical positions in front of the posts 7, each spring having its upper portion secured in a suitable way, as by a screw 17, to one of the posts, while the lower end of the spring is attached to the rear end of the lever 12 or to the corresponding end of the arm 13. The lever 12 extends practically from the front portion to the rear portion of the main frame, and this front end of the lever is equipped with a suitable key $12^b$. The weight of the platen and the carriage imposed on the carriage frame and the stems 9 is sufficient to overcome the tension of the springs 16, so that the platen will normally remain in position to receive the impact of the lower case type on the heads of the type levers to be presently described, and these springs 16 serve to normally hold the lever 12 and the arm 13 in engagement with the vertically slidable stems 9. The lever 12 serves as the means for raising the carriage and the platen to the highest point of adjustment contemplated by this invention and as indicated by Fig. 3 of the drawings, so that the numerals and punctuation marks on the type heads of the type-levers may be pressed against the platen; but to bring the platen and the carriage into position to receive the impact of the upper case type on the type-levers an auxiliary shifting lever 18 is employed. This auxiliary shifting lever is arranged alongside of the primary shifting lever 12, and the rear end of said auxiliary lever is bent downwardly, as at $18^a$, and connected pivotally by a pin $18^b$ to the lever 12 at a point in rear of the offset portion $12^a$. Said lever 18 is also provided with a key 19 and with a laterally extending finger 20, the latter being arranged to project laterally from the key 19 and to rest upon the front portion of the shifting lever 12, as shown more clearly by Fig. 1. The auxiliary shifting lever is thus pivoted at one end with a finger which engages with said lever 12 thus insuring a simultaneous movement of the levers 18 and 12 when pressure is applied to the finger piece 19; but as the platen and the carriage should not be raised as high when the lever 18 is depressed as when the lever 12 is likewise actuated a stop 21 on one side bar 5 of the main frame is provided, said stop 21 being disposed in the path of the finger 20 and arranged to limit the depressing movement of the auxiliary shifting lever 18.

The important features of the present invention is the provision of means whereby the platen and its carriage may be folded into compact relation to the banks of keys, thus making provision for convenient transportation of the instrument. In carrying out this part of the invention a foldable sectional construction is employed of a frame adapted to support the carriage and the platen, and in the drawings this frame is shown as consisting of two main parts, one of which is carried by the adjustable stems 9, while the other part is pivoted to the non-foldable part and serves as a track for the platen carriage. The non-folding part of the carriage frame thus far described consists of arms 22 23, arranged in horizontal positions to extend from the front sides of the stems 9 and having their rear portions secured firmly to said stems. The folding part of the carriage frame consists of arms 24 25 and a base-plate 26. Said arms 24 25 of the folding member of the carriage frame normally lie alongside of the arms 22 23, and the two pairs of arms are pivoted directly together, as at 27, in any suitable way. Said pivoted arms 24 25 are arranged to rest upon the arms 22 23 when the carriage and the platen are adjusted in their operative positions, as in Figs. 1 to 4, inclusive, thus sustaining the two parts of the frame in compact relation and skeletonizing the frame, so that the type-levers may work between the arms in a way to strike against the platen 10.

The base 26, constituting a part of the movable member of the carriage frame, consists in the embodiment of the invention shown by the drawings of a flat plate having an upstanding flange 28, and this base-plate is rigidly secured to the rear ends of the arms 24 25, the latter being somewhat longer than the arms 22 23. The base-plate 26 joins the arms 24 25 rigidly, and this plate and its flange form the track surfaces for the endwise movable carriage, which, as in ordinary typewriting machines, is capable of a traveling step-by-step movement under the control of a suitable spring and an escapement mechanism. The upstanding flange 28 on the plate 26 has its upper edge arranged to form one of the track surfaces for the carriage of the roller platen, while the top face of the plate 26 affords the other track surface for a roller of the platen carriage to be presently described.

The carriage consists of a longitudinal rail 29, a pair of brackets 30, and a tie-rod 31. The brackets 30 are rigidly secured in a suitable way to the rail 29, and these brackets are joined by the tie-rod 31, which serves to hold the brackets in firm relation to the rail and in parallel relation to each other. The rail 29 is fashioned to ride or travel directly upon the track surface afforded by the upper edge of the flange 28, forming a part of the plate 26, and the carriage is held in proper relation to the plate 26 by means of one or more blocks 32, secured to the rear face of the flange 28, said block or blocks being provided with a lip 33, arranged to slide in a groove 34 of the rail 29, as shown more clearly by Fig. 4 of the drawings. The brackets 30 are provided with openings adapted to receive the shaft of the roller platen 10, the latter being free to turn in the bearings afforded by said brackets. This platen may be of any suitable construction known to the art—as, for instance, a core covered by a rubber jacket—and said roller is provided at one or both ends with suitable gripping wheels 35, by which the roller may be conveniently turned by hand. The brackets 30 are also connected at their front ends by a rail 36, which is disposed below the roller platen and fastened at its ends to the brackets in any approved way, and this rail 36 has a track roller 37 mounted thereon in a way to turn freely, said roller riding on the track afforded by the plate 26 of the carriage frame. The carriage is adapted to carry a ratchet bar 38, which may be fastened to the brackets 30 or to the rail 36, and with the teeth of this ratchet bar are adapted to engage the pawls of a suitable escapement mechanism. It is to be understood that the carriage and the platen are normally drawn in one direction by the action of a spring contained within a suitable drum and that the movement of the carriage is controlled by an escapement; but as the spring and the escapement mechanism do not form any part of the present invention it is not considered necessary to illustrate or to describe said devices in detail.

40 designates a pivotal plate secured between the rear posts 7, said plate having notches or recesses 42, in which are fitted the type-levers 43. Each type-lever has a shoulder 44, pivoted by a pin 45 to the plate 40, and said type-lever has a head 46, which is provided with a series of type characters 47. The heads 46 of the type-levers are adapted to rest on a cushion 48, provided on a rest bar 49, having legs 50 attached to the machine frame.

51 designates a series of key-levers each provided at its front end with a shank 52, having a finger piece 53. Each key-lever has a short upstanding lug 54, provided with a pivotal sleeve 55, and the rear end of each lever has a notch 56, across which extends a pin 57, adapted to receive the hook 58 of a link 59, the upper end of said link being suitably connected to the shoulder 44 of the type-lever.

60 designates a series of pivotal rods on which are loosely hung the sleeves 55 of the key-levers.

The keys are held under tension by coiled springs 61, which lie below the banks of key-levers. Said springs are connected to cross-rods 62, which are attached to supporting plates 63, the latter being slidable on the members 5 of the machine frame. The plates are adjusted by manipulating the rods 64, which are loosely supported in the main frame and have threaded engagement with the plate 63, whereby the tension of the springs may be increased or decreased to secure the desired tension of the key-levers.

The improved machine should be equipped with an inking mechanism, which is preferably carried by the carriage supporting frame. Any suitable kind of inking device may be employed—such, for example, as an inked ribbon adapted to be coiled on and uncoiled from suitable spools, said ribbon arranged to pass through a suitable guide on the carriage supporting frame in order to lie adjacent to the roller platen.

The operation of the invention will be readily understood from the foregoing description, taken in connection with the drawings. The depression of one of the key-levers pushes on the link 59 to raise the corresponding type-lever 43, and assuming that the carriage is in its normal lowered position (shown by Figs. 2 and 4) the lower case type of the key-lever will strike through an inked ribbon against the paper confined on the platen, thus securing the desired impression. If it is desired to have the upper case type strike through the inked ribbon against the work, the operator should depress the auxiliary shifting key 18 until its finger 20 strikes the stop 21, and this movement of said lever 18 causes the finger 20 to depress the shifting lever 12, whereby the shaft 15 is turned and the lever 12, together with the arm 13, raises the posts 9 a limited distance, thus bringing the roller platen 10 into position to receive the impact of the upper case type. To utilize the type representing the numerals and punctuation marks, the operator should depress the key-lever 12, thus turning the shaft 15 and operating the arm 13 simultaneously with said lever 12 to elevate the carriage and platen to the highest point, as represented by Fig. 3, thus making the platen take a position in the path of the outermost type on either of the type-levers 42. As before indicated, the tension exerted by the springs on the key-levers may be varied by adjusting the rod 64 to change the positions of the plates 63 and the rods 62, thus slackening or increasing the tension of the springs 61. When it is desired to carry or transport the machine, the carriage frame, together with the carriage and the platen, are adjusted by turning the arms 24 25 on the pivots 27, which connect said arms with the non-adjustable member of the carriage frame. By turning the arms 24 25 and the plate 26 in a forward and downward direction the position of the carriage and the platen is inverted to assume the compact relation to the banks of keys indicated by dotted lines in Fig. 2. The carriage and platen may be allowed to rest on the keys; but the employment of adjustable rests is also contemplated, which may be embodied in the form of plates 65, which are pivoted to the sides 5 of the machine frame. Said plates are provided with concave free edges to snugly receive the platen 10, and the plates are held in their raised positions by the engagement of the platen therewith.

The improved machine of the invention presents a compact construction and arrangement of parts. It is light in weight and easy and convenient to operate.

The coiled springs 16, which are connected to the arm 13 and lever 12, not only hold these parts in engagement with the slidable stems, but also assist in raising the stems and the weight imposed thereon, thus insuring easy motion to the lifting of the platen carriage on the depression of either of the shifting keys.

It is evident that any suitable means may be used for holding the foldable member of the carriage supporting frame in its normal operative position relative to the non-foldable member of said frame. As shown, said foldable frame member is adapted to rest when folded on shoulders formed by the upper ends of the stems 9; but this is an immaterial feature of the carriage supporting frame.

It will be observed that in the invention shown and described the line or plane of fold lies below the platen carriage and above the type-bars, keys and their connections. Therefore, the folding movements of the platen carriage take place in an arc above the type-bars, keys and their connections permitting the latter to remain in their normal operative position in the rigid main frame in both the folded and unfolded positions of the platen carriage and during its folding movements.

The principle of construction and mode of operation pointed out in the last paragraph are important and the practical success of the folding typewriter is largely due to them for the following reasons:—1. Because it permits the standard construction of keyboard, type basket and their connections which operators desire in practical use to be retained. 2. Because the relative position of said parts is permitted to remain constant and they may be retained within a rigid frame and therefore be immune from any disorganization such as would result from a change in their normal relationship during folding. 3. The key-operated levers connect with individual type-bars and therefore they preserve those characteristics of touch and ease of operation which inhere in that simple and direct form of construction.

Having thus fully described the invention, what is claimed as new, and desired to be secured by Letters Patent is:—

1. In a type-writer, key-operated type, and a foldable support for a carriage and a platen, consisting of a non-adjustable member, and an adjustable member foldably connected with said non-adjustable member and movable from a normal to an abnormal and compact position out of the path of the type, combined with a carriage mounted to travel on the adjustable member of said support, and a platen supported by said carriage.

2. In a type-writer, a foldable support for a carriage and platen, consisting of a skeletonized non-adjustable member, and an adjustable member having pivotal connection with said non-adjustable member and foldable relatively thereto from a normal to an abnormal and compact position, in combination with a carriage mounted on the adjustable member, and a platen supported in said carriage.

3. In a type-writer, a foldable support for a carriage and a platen, consisting of a non-adjustable member, and an adjustable member pivotally connected with said non-adjustable member and movable from a normal to an abnormal compact position, combined with a carriage mounted on the adjustable member, and a platen in said carriage, said adjustable member and the parts supported thereby being arranged to rest in normal position on the non-adjustable member of the support.

4. In a type-writer, the combination of a two-part foldable carriage support, a traveling platen carriage mounted on the foldable part of said carriage support and movable from a normal to an abnormal compact position, and means for shifting said carriage support and the platen carriage bodily in a vertical plane.

5. In a type-writer, the combination of a foldable carriage supporting frame, a traveling platen carriage mounted on the foldable member of said carriage frame to be foldable therewith from a normal to an abnormal compact position, and means for bodily raising and lowering the carriage supporting frame and the carriage thereon in a vertical plane.

6. In a type-writer, the combination of vertical posts, a two-part carriage frame having a non-foldable member mounted on said posts and movable vertically therewith, a platen carriage supported by said foldable member of the frame to travel thereon and to be raised or lowered bodily with said carriage frame, said foldable member moving the platen carriage from a normal to an abnormal compact position, and means controllable at will for adjusting the carriage frame and the carriage thereon in a vertical plane.

7. In a type-writer, the combination of vertical posts, a two-part carriage frame having one member attached to said posts, and a foldable member pivoted to said first-named member for adjustment to an abnormal position relatively thereto, a platen carriage carried wholly by the adjustable member of said frame for movement vertically and foldably therewith from a normal to an abnormal compact position, and means for vertically adjusting the supporting frame and the carriage thereon.

8. In a type-writer, a carriage supporting frame consisting of a skeletonized non-adjustable member, and an adjustable member pivoted to said skeletonized member and equipped with a base-plate affording two track surfaces, in combination with a platen carriage mounted on said base-plate to travel thereon and to be foldable to an abnormal compact position with the adjustable member of the carriage supporting frame.

9. In a type-writer, a foldable carriage supporting frame consisting of a skeletonized non-adjustable member, and an adjustable member pivoted to said non-adjustable member, said adjustable member of the frame having a track surface, combined with a platen carriage fitted to said track surface of the adjustable frame member to travel thereon and to be foldable therewith from a normal to an abnormal compact position, and means for bodily shifting the carriage frame and its contained parts in a vertical direction.

10. In a visible typewriting machine, the combination of a non-folding frame, type-bars and key-operated levers supported in said frame and operatively connected together, one key-operated lever for each type-bar, two foldable members supported by said frame, each member having two forwardly extending side arms, said arms of each member being spaced apart and the arms of one member being arranged alongside of the arms of the other member and pivoted thereto at their forward ends, means whereby both supporting members may be moved vertically, a bed rigidly connected to two of said arms, and a platen carriage movable transversely of the machine along said bed above the frame and at the rear thereof so as to extend beyond the frame when in its normal working position and foldable forward out of the path of the type-bars with the bed from the rear of the machine to an inverted overhanging compact relation at the forward part of the frame.

11. In a visible typewriting machine, the combination of a non-folding main frame, type-bars, key-operated levers forming a part of a keyboard supported in said frame and operatively connected to said type-bars, one key-operated lever for each type-bar, a pivotally held member supported by said frame and having two horizontally arranged side arms, and a platen carriage supported by said arms and movable transversely of the machine at the rear thereof when in its normal working position and foldable forward with the arms from its normal position at the rear of the machine to an inverted overhanging compact relation at the forward part of the frame.

12. In a visible typewriting machine, a keyboard, a platen carriage, a non-folding member, and a foldable member for the platen carriage provided with horizontally arranged side arms pivotally held to the non-folding member and foldable with the platen carriage into compact relation to the keyboard when not in use.

13. In a visible type-writer, type-bars, a key-operated lever for each type-bar forming a part of a keyboard, a non-folding frame in which the levers and type-bars are mounted, a platen carriage, and a foldable supporting member for the platen carriage movable to an abnormal position in overhanging and compact relation to the keyboard.

14. In a typewriting machine, type, key-operated levers forming a part of a keyboard and operatively connected to the type, each key-operated lever being adapted to move a type to printing position, a non-folding main frame in which the type and levers are mounted, a platen carriage, and means for supporting the carriage at the rear part of the frame in its normal position and foldable with said carriage at the front of the machine near the keyboard out of the path of the type and in a compact position when not in use.

15. In a visible typewriting machine, the combination of a main frame, type, and key-operated levers supported in said frame and operatively connected together, two side arms pivotally supported at their forward ends and supported by the main frame at the rear thereof, a carriage bed rigidly held to said arms, means whereby the bed may be moved vertically, and a platen carriage movable transversely of the machine along said bed at the rear of the frame and foldable forward with the bed from its position at the rear of the machine to inverted overhanging and compact relation at the forward part of the frame.

16. In a typewriting machine, a keyboard, a main frame in which the keyboard is mounted, two pair of horizontally arranged arms pivotally held together at their forward ends in pairs, one pair of arms being in overlapping relation to the other pair of arms lengthwise thereof in all normal positions of the carriage, means for shifting the arms vertically without disturbing their relation, a platen, and a carriage in which the platen is rotatably mounted to move transversely of the machine on one pair of arms and movable with said arms in overhanging compact relation to the forward part of the machine.

17. In a typewriting machine, a keyboard, a platen carriage, a non-folding main frame in which the keyboard is mounted, a pivotally supported skeletonized member on which the platen carriage is mounted and which is foldable with the platen carriage to place the latter in overhanging compact relation to the keyboard when not in use and reduce the cubical dimensions of the machine.

18. In a typewriting machine, a keyboard, a platen carriage, a non-folding frame in which the keyboard is mounted, a pivotally held supporting member for the platen carriage movable with the platen carriage from a normal position into compact relation to the keyboard above the front of the frame when not in use to reduce the cubical dimensions of the machine, and means for shifting said supporting member and platen carriage when in normal working position.

19. In a typewriting machine, the combination of a main frame, type-bars and key-operated levers supported in said frame and operatively connected together, one key-operated lever for each type-bar, two horizontally arranged supporting members movable in said frame and foldable with respect to each other, each member having two forwardly extending side arms, one pair of arms being arranged alongside the other pair of arms lengthwise thereof and pivoted thereto at the forward ends thereof, a bed rigidly connected to two of said arms, and a platen carriage movable transversely of the machine along said bed above the frame and at the rear thereof so as to overhang the frame when in its normal working position and foldable forward with the bed from its position at the rear of the machine to an inverted overhanging relation out of the path of the type-bars at the forward part of the frame.

20. In a visible typewriting machine, the combination of a keyboard having printing keys, type operatively connected to be moved when each key is depressed, a non-folding member, a folding member provided with side arms engaging the non-folding member lengthwise thereof and pivoted to said non-folding member at the forward part thereof, means for shifting said arms, and a platen carriage mounted on said arms and movable therewith from the rear of the machine into compact relation to the keys to reduce the cubical dimensions of the machine when not in use and without disturbing the relation between the keys and the type.

21. In a typewriting machine, the combination of a keyboard having key-operated levers, type operated by said levers, a foldable member, a platen and a carriage therefor held to said member and foldable therewith out of the path of the type into close relation to the keyboard without disturbing the relation between the key-operated levers and the type, and means for shifting the foldable member in a vertical direction.

22. In a visible typewriting machine, the combination of a keyboard having key-operated levers, type-bars one for each lever operated by said levers, a foldable member, and a platen carriage held to said member and foldable therewith out of the path of the type-bars into close relation to the front of the machine without disturbing the relation between the key-operated levers and the type-bars.

23. In a front-strike typewriting machine, the combination of a keyboard having key-operated levers, upwardly and rearward moving type-bars each operated by one of said levers, a non-folding rigid frame for the said levers and type-bars, a horizontally arranged foldable member supported at the upper portion of the frame, a platen and a carriage therefor held to move along said member and foldable therewith out of the path of the type-bars into overhanging relation to the keyboard without disturbing the relation between the key-operated levers and the type-bars, and means for shifting the foldable member in a vertical direction to adapt the type-bars to carry a plurality of type.

24. In a typewriting machine, a non-folding rigid frame, a keyboard having keys supported in the frame, type-bars pivotally held in said frame and each connected to an individual key, a carriage, a platen mounted in said carriage, and a horizontally arranged foldable supporting member for the platen carriage located at the upper portion of the frame above the type-bars and movable forward in the arc of a circle over the type-bars out of the path thereof to the forward part of the frame to make the machine more compact than when in use.

25. In a front-strike typewriting machine, the combination of a keyboard having key-operated levers, type-bars carrying a plurality of type and each bar operated by one of said levers, a carriage, a platen mounted in the carriage and normally in the path of movement of the type and movable forward with the carriage away out of the path of the type and into compact relation to the forward part of the machine when not in use without disturbing the relation between the type-bars and key-operated levers, and means for shifting the platen carriage vertically.

26. In a visible typewriting machine, the combination of a main frame, a keyboard at the forward part of the machine, type operatively connected to certain of the keys of the keyboard, a horizontally arranged supporting member having side arms pivotally held at their forward ends, and a platen carriage adapted to move along said member transversely of the machine and adapted to be folded forward with the arms from the rear part of the machine over the front part of the frame to reduce the cubical dimensions of the machine when not in use without disturbing the relation between the keys and the type.

27. In a typewriting machine, the combination of key-operated levers, type operatively connected to the key-operated levers to adapt a single type to be printed on the depression of each key, a foldable support having arms arranged in pairs alongside of each other, one pair of arms being pivoted to another pair of arms at their forward ends, and a platen carriage supported by one pair of arms to move transversely of the machine and adapted to be moved from a position at the rear of the machine to an inverted overhanging relation to the keys of the levers and reduce the cubical dimensions of the machine for transportation purposes.

28. In a visible typewriting machine having a universal or standard keyboard, the combination of key-operated levers and type operated by said levers, a carriage, and a platen mounted in the carriage and normally in the path of said type and foldable with the carriage out of its normal position away from the type and into compact relation to another part of the typewriter to occupy less space than when in use.

29. In a visible typewriting machine having a universal or standard keyboard, the combination of key-operated levers and type operated by said levers, a carriage, a platen mounted in the carriage and normally in the path of said type and foldable with the carriage out of its normal position away from the type and into compact relation to another part of the typewriter to occupy less space than when in use, and means for shifting the platen carriage vertically when in its normal working position only.

30. In a front-strike typewriting machine having a universal or standard keyboard, type-bars, a key-operated lever connected to each type-bar, a vertically movable carriage, a platen mounted on the carriage and normally in the path of said type-bars and foldable bodily forward with the carriage into compact relation to another part of the typewriter out of the path of the type-bars to occupy less space than when in use, and means forming a part of the keyboard for elevating the carriage and platen when in a normal operative position.

31. In a visible typewriting machine, the combination of a keyboard having key-operated levers, type-bars operated by individual key-operated levers, a platen carriage, means for shifting the platen carriage in a vertical direction, and a foldable support on which the platen carriage is mounted, said support having the platen carriage normally in the path of the type-bars when in a working position and moving said carriage out of the path of the type-bars over the keyboard to reduce the size and cubical dimensions of the machine for transportation purposes.

32. In a typewriter, the combination of a main rigid frame, a keyboard mounted in said frame, vertical posts movably held at the rear corners of the frame, a non-folding member attached to said posts, a foldable member pivoted to said non-folding member for movement to an abnormal compact position relatively thereto over the front part of the main frame, a platen carriage carried wholly by the foldable member for movement vertically and foldable therewith, and means for shifting vertically both members and the carriage thereon.

33. In a typewriter, the combination of vertical posts, two side arms attached to said posts, and a foldable member having side arms pivoted to the first-mentioned side arms and extending alongside of said latter arms and movable to an abnormal compact position relatively thereto, a platen carriage carried wholly by the foldable member for movement vertically and foldable therewith, and means for vertically shifting the foldable member and the carriage thereon.

34. In a visible typewriter, a rigid main frame, a skeletonized non-folding member movable in the main frame, and a folding member pivoted to said skeletonized member and equipped with a base plate affording two track surfaces, in combination with a platen carriage mounted on said base plate to travel thereon and to be foldable with the folding member from a high normal operative position to a lower and more compact position when not in use.

35. In a front-strike typewriting machine, the combination of a universal keyboard having keys, type-bars having type operated by individual keys, a carriage, a platen mounted on said carriage, and a support having relatively movable members whereby the platen and carriage and keys of the keyboard may be brought into close relation to make the machine more compact when not in use than when in a normal working position.

36. In a front-strike typewriting machine, the combination of a universal keyboard having keys, type-bars having type operated by individual keys, a carriage, a platen mounted on said carriage, a support having relatively movable members whereby the platen and carriage and keys of the keyboard may be brought into close relation to make the machine more compact when not in use than when in a normal working position, and means for giving a relative shifting movement between the platen and carriage and the type bars to adapt the latter to have a plurality of type characters.

This specification signed this 19th day of May, A. D. 1915.

CORONA TYPEWRITER COMPANY, INC.,
By CARLETON F. BROWN,
*Treasurer.*

Witnesses:
NONNA STEWART,
ROBERT BASTON.